O. M. POND.
Grain Drill.
No. 48,590.                           Patented July 4, 1865.
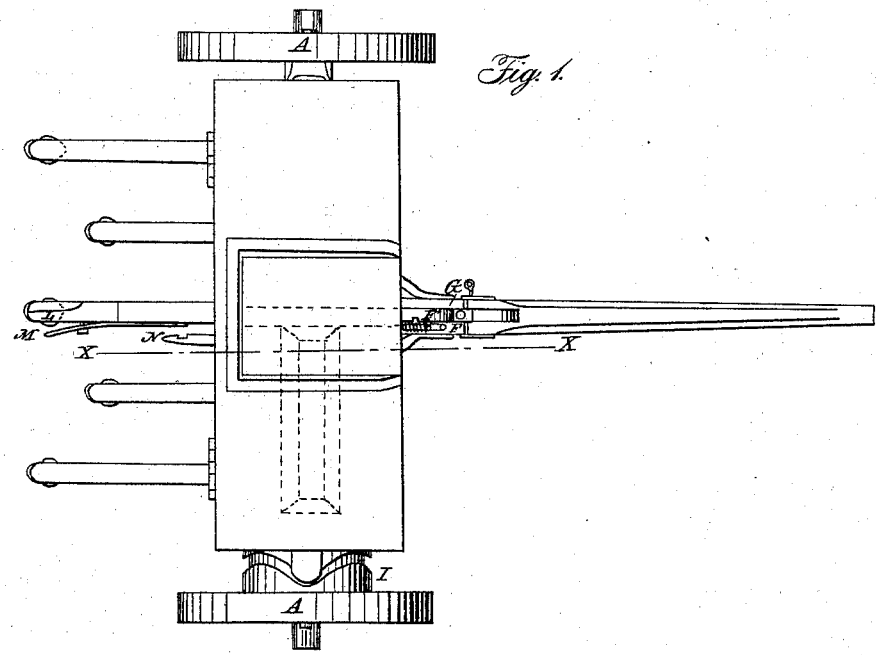
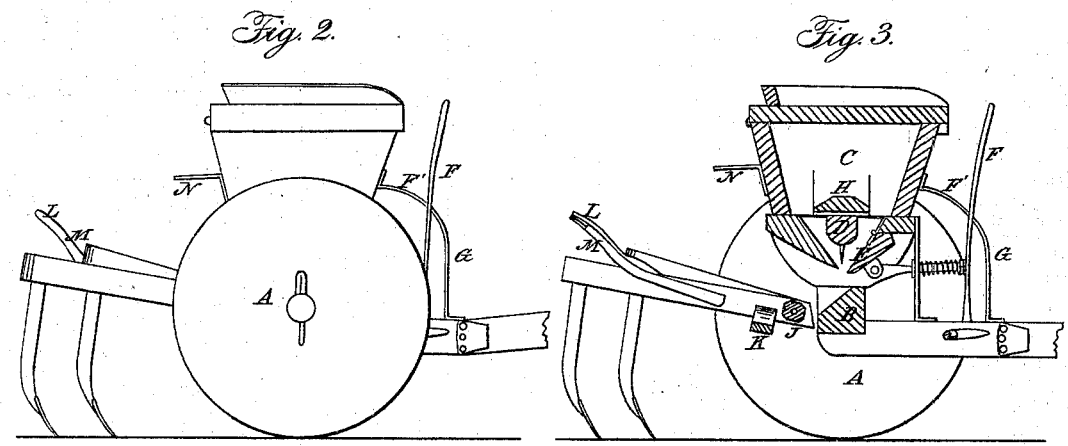
Witnesses:
Inventor:

UNITED STATES PATENT OFFICE.

O. M. POND, OF INDEPENDENCE, IOWA.

IMPROVEMENT IN SEEDING-MACHINE AND CULTIVATOR COMBINED.

Specification forming part of Letters Patent No. 48,590, dated July 4, 1865.

*To all whom it may concern:*

Be it known that I, O. M. POND, of Independence, in the county of Buchanan and State of Iowa, have invented new and useful Improvements in Combined Seeding-Machine and Cultivator, (being an improvement on a patent issued to me October 20, 1863;) and I do hereby declare that the following is a full and complete description of the construction and operation of the same, reference being had to the accompanying drawings, making part of this specification, in which—

Figure 1 is a top view. Fig. 2 is an end view, and Fig. 3 is a transverse section in the direction of the line $x\ x$.

The nature of my invention relates to a combined seeding-machine and cultivator, as hereinafter set forth.

A represents the bearing-wheels, and B the axle-tree.

C represents the seed-box.

D represents a toothed vibrating rake placed in the bottom of the hopper, the points of the teeth terminating near the seed-opening in the bottom of the box.

E is a hinged valve running the whole length of the seed-box. This valve can be opened more or less at pleasure by means of the lever F, being secured in notches F' in the curved rod G.

H represents a guard placed just above the vibrating rake and running its whole length, leaving a narrow space upon each side for the descent of the grain. The rake receives a vibrating motion by means of a pin working in a cam, I, attached to one of the wheels.

The beams of the cultivator-teeth are all hinged on the rod J, and all except the middle one have a free vertical movement as regards each other. To the under side of this middle one is secured the bar K, which extends beneath all the others, and upon which they rest, and by raising this one by means of the handle L all the teeth are raised from the ground, in which elevated position they can be secured by means of the spring M and catch N. When the teeth are upon the ground each one has an independent action, and by means of the pole or tongue O, being hinged or jointed at P to the reach Q, the teeth R are caused to enter the ground more or less by elevating or depressing the reach at the joint, and securing it in place by means of the pin S, which passes through holes in the end of the tongue, reach, and the side plates, T. By this arrangement the reach may be raised or lowered, so as to have a corresponding effect upon the teeth in the ground, and at the same time the tongue may be adjusted to teams of various heights.

What I claim as my improvement, and desire to secure by Letters Patent, is—

1. The arrangement of the described devices for jointing the tongue and reach together and securing said joint in place, as may be required in raising and lowering said tongue and reach, in combination with the cultivator apparatus, in the manner and for the purposes set forth.

2. Hinging the beams of the cultivator-teeth to the rod J, as described, in combination with the bar K, when the said bar is attached as set forth, and operating as and for the purpose herein specified.

O. M. POND.

Witnesses:
S. WOODS,
C. R. WALLACE.